(12) United States Patent
Kim et al.

(10) Patent No.: US 10,161,072 B2
(45) Date of Patent: Dec. 25, 2018

(54) LAUNDRY TREATMENT APPARATUS

(71) Applicant: LG ELECTRONICS INC., Seoul (KR)

(72) Inventors: Youngjun Kim, Seoul (KR); Youngjong Kim, Seoul (KR); Insik Yu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/125,076

(22) PCT Filed: Mar. 11, 2015

(86) PCT No.: PCT/KR2015/002373
§ 371 (c)(1),
(2) Date: Sep. 9, 2016

(87) PCT Pub. No.: WO2015/137734
PCT Pub. Date: Sep. 17, 2015

(65) Prior Publication Data
US 2017/0016164 A1    Jan. 19, 2017

(30) Foreign Application Priority Data

Mar. 11, 2014 (KR) .................. 10-2014-0028496
Mar. 11, 2014 (KR) .................. 10-2014-0028497
Mar. 11, 2014 (KR) .................. 10-2014-0028498

(51) Int. Cl.
*D06F 37/20* (2006.01)
*D06F 37/24* (2006.01)
*D06F 23/04* (2006.01)

(52) U.S. Cl.
CPC ............ *D06F 37/20* (2013.01); *D06F 37/203* (2013.01); *D06F 37/24* (2013.01); *D06F 23/04* (2013.01)

(58) Field of Classification Search
CPC ........ D06F 37/20; D06F 37/24; D06F 37/203; F16F 7/09; F16F 7/10; F16F 15/03
See application file for complete search history.

(56) References Cited

U.S. PATENT DOCUMENTS 3,744,746 A * 7/1973 Weir ................. D06F 37/24
                                                    210/364
4,934,493 A * 6/1990 Bauer ............... D06F 37/20
                                                    188/129

(Continued)

FOREIGN PATENT DOCUMENTS

CN          1570251          1/2005
CN        101082169         12/2007

(Continued)

OTHER PUBLICATIONS

International Search Report (with English translation) and Written Opinion dated Jul. 14, 2015 issued in Application No. PCT/KR2015/002373.

(Continued)

*Primary Examiner* — Joseph L. Perrin
(74) *Attorney, Agent, or Firm* — KED & Associates, LLP

(57) ABSTRACT

A laundry treatment apparatus according to the present invention includes a casing; an outer tub disposed in the casing; a support rod connected at one end thereof to the casing; an outer tub support part, which is moved along the support rod and which supports the outer tub; at least one elastic member fixedly disposed on the support rod so as to elastically support the outer tub support part from below; a first friction part disposed above the outer tub support part so as to create frictional force between the support rod and the first friction part; and a housing defining therein a space for accommodating the first friction part, the housing being disposed at the top of the outer tub support part and being moved along with the outer tub support part when the outer (Continued)

tub vibrates, and the housing being independently moved alone when the outer tub support part is moved within a predetermined displacement range and being moved while pushing the first friction part when the outer tub support part is moved beyond the predetermined displacement range.

26 Claims, 18 Drawing Sheets

(56) References Cited

U.S. PATENT DOCUMENTS

| | | | |
|---|---|---|---|
| 5,906,056 A | 5/1999 | Noguchi et al. | |
| 6,089,053 A * | 7/2000 | Colombera | D06F 37/20 210/144 |
| 6,151,930 A * | 11/2000 | Carlson | D06F 37/20 68/12.06 |
| 6,264,014 B1 * | 7/2001 | Ferlicca | D06F 37/20 188/129 |
| 6,474,113 B1 * | 11/2002 | Park | D06F 37/24 68/23.3 |
| 9,068,616 B1 | 6/2015 | Serbu | |
| 9,127,396 B2 | 9/2015 | Yu et al. | |
| 2007/0068258 A1 | 3/2007 | Lee et al. | |
| 2010/0154130 A1 | 6/2010 | Han et al. | |
| 2011/0308281 A1 * | 12/2011 | Yu | D06F 37/22 68/212 |
| 2013/0247622 A1 * | 9/2013 | Yu | D06F 37/24 68/13 R |
| 2014/0090939 A1 * | 4/2014 | Kanioz | F16F 7/09 188/271 |

FOREIGN PATENT DOCUMENTS

| | | |
|---|---|---|
| CN | 101429718 | 5/2009 |
| CN | 101558196 | 10/2009 |
| CN | 102971457 | 3/2013 |
| CN | 103109010 | 5/2013 |
| JP | H 09-177875 | 7/1997 |
| JP | 2009-029360 | 2/2009 |
| JP | 4791981 | 10/2011 |
| KR | 20-1998-0027420 | 8/1998 |
| KR | 20-0141005 | 5/1999 |
| KR | 10-0207078 | 7/1999 |
| KR | 10-0664072 | 1/2007 |
| KR | 10-0970882 | 7/2010 |
| KR | 10-2012-0029853 | 3/2012 |
| KR | 10-2012-0108373 | 10/2012 |

OTHER PUBLICATIONS

International Search Report (with English translation) and Written Opinion dated Jul. 21, 2015 issued in Application No. PCT/KR2015/002374.

Chinese Office Action dated Mar. 28, 2018 issued in Application No. 201580024492.0 (with English Translation).

Chinese Office Action dated May 9, 2018 issued in Application No. 201580024499.2 (with English Translation).

U.S. Office Action dated Oct. 3, 2018 issued in U.S. Appl. No. 15/125,098.

\* cited by examiner (a)

(b)

LAUNDRY TREATMENT APPARATUS

CROSS-REFERENCE TO RELATED PATENT APPLICATIONS

This application is a U.S. National Stage Application under 35 U.S.C. § 371 of PCT Application No. PCT/KR2015/002373, filed Mar. 11, 2015, which claims priority to Korean Patent Application No. 10-2014-0028496, filed Mar. 11, 2014, Korean Patent Application No. 10-2014-0028497, filed Mar. 11, 2014, and Korean Patent Application No. 10-2014-0028498, filed Mar. 11, 2014, whose entire disclosures are hereby incorporated by reference.

TECHNICAL FIELD

The present invention relates to a laundry treatment apparatus.

BACKGROUND ART

In general, a laundry treatment apparatus, which is an appliance that treats clothes by applying physical and chemical action to the clothes using water and detergent, includes a casing, and outer and inner tubs disposed in the casing. The outer tub is disposed in the casing in a suspended manner, and the inner tub is rotatable in the outer tub. Vibrations resulting from the rotation of the inner tub have to be adequately controlled in view of the stability of the entire system.

In recent years, it has been required to increase the size of an inner or outer tub as large as possible, which results in an increase in the capacity of treating clothes, while preventing an increase in the volume of the entire washing machine, in response to the recent trend toward increased washing capacity. To this end, the distance between the inner tub and the outer tub and the distance between the outer tub and the casing are increasingly reduced. Since collision between the components may occur when vibrations are not sufficiently absorbed, there is a necessity to provide a solution to this problem.

DISCLOSURE

Technical Problem

It is an object of the present invention to provide a laundry treatment apparatus capable of more efficiently absorbing vibrations.

Technical Solution

A laundry treatment apparatus according to the present invention includes a casing; an outer tub disposed in the casing; a support rod connected at one end thereof to the casing; an outer tub support part, which is moved along the support rod and which supports the outer tub; at least one elastic member fixedly disposed on the support rod so as to elastically support the outer tub support part from below; a first friction part disposed above the outer tub support part so as to create frictional force between the support rod and the first friction part; and a housing defining therein a space for accommodating the first friction part, the housing being disposed at the top of the outer tub support part and being moved along with the outer tub support part when the outer tub vibrates, and the housing being independently moved alone when the outer tub support part is moved within a predetermined displacement range and being moved while pushing the first friction part when the outer tub support part is moved beyond the predetermined displacement range.

Advantageous Effects

The laundry treatment apparatus according to the present invention has the following advantages. First, the apparatus has improved shock-absorbing capability to absorb vibrations of the outer tub, compared to a conventional technology.

Second, there is an effect of providing increased washing capability, compared to the conventional technology.

Third, since the upward displacement of the outer tub decreases, compared to the conventional technology, it is possible to reduce the distance between the upper (or lower) portion of the casing and the outer tub. As a result, since the overall height of the laundry treatment apparatus is reduced, there is an effect of enabling laundry to be easily introduced into and taken out of the apparatus.

Fourth, since the extent of shock-absorption by the shock-absorbing unit varies depending on the amount that the outer tub is displace, shocks are gently absorbed in a normal vibration state, in which the vibration of the outer tub is relatively low, whereas shocks are intensively absorbed in an excessive vibration state, in which the vibration of the outer tub is relatively high, thereby providing an effect of assuring stability regardless of the magnitude of vibration.

BEST MODE

The advantages, features and methods for achieving those of embodiments may become apparent upon referring to embodiments described later in detail together with the attached drawings. However, the embodiments are not limited to the embodiments disclosed hereinafter, but may be embodied in different modes. The embodiments are provided for completeness of the disclosure and to inform the scope thereof to persons skilled in this field of art. The same reference numbers may refer to the same elements throughout the specification.

Hereinafter, although the laundry treatment apparatus according to the present invention will be described with reference to a washing machine, which is one kind of laundry treatment apparatus, the present invention should not be construed as being limited thereto.

Figure 1:
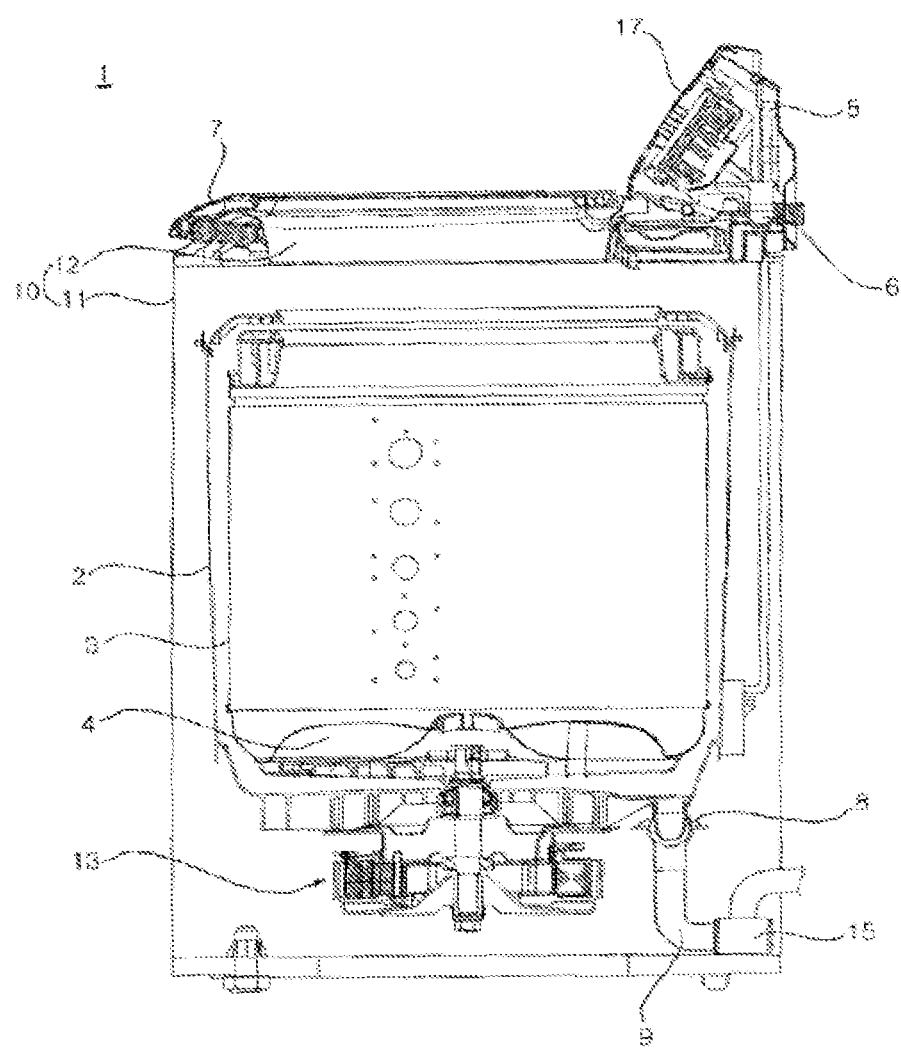
FIG. 1 is a view illustrating a washing machine according to an embodiment of the present invention.

FIG. 1 is a view illustrating a washing machine according to an embodiment of the present invention. Referring to FIG. 1, the washing machine 1 according to the embodiment of the present invention may include a casing 10, an outer tub 2 disposed in the casing 10 so as to contain washing water, an inner tub 3 rotatably disposed in the outer tub 2 so as to contain laundry, and a drive unit 13 for rotating the inner tub 3.

The casing 10 serves to provide a space, which accommodates various components constituting the washing machine 1, such as the outer tub 2, the inner tub 3 and the drive unit 13. The casing 10 may include a cabinet 11 with an upper end opening upward, and a top cover 12 coupled to the upper end of the cabinet 11 and provided at the approximate center thereof with an introduction port, through which clothes are introduced into the cabinet 11.

The top cover 12 may be provided with a door 7 for opening and closing the introduction port. Furthermore, the top cover 12 may be provided with a control panel 17, which displays information about the state of operation of the washing machine 1 and provides an interface for receiving various control commands for operation of the washing machine 1.

The outer tub 2 is suspended in the casing 10. Although not shown in FIG. 1, the washing machine may be provided with a support unit for suspending the outer tub 2 in the casing 10. The support unit may serve as a buffer capable of absorbing vibrations. The support unit will be described in detail later with reference to other drawings.

The inner tub 3 may be provided on the bottom thereof with a rotatable pulsator 4. The pulsator 4 may be rotated by the drive unit 13. The pulsator 4 may be rotated alone or in conjunction with the inner tub 3 through appropriate operation of a clutch (not shown). The inner tub 3 has a plurality of through holes (not shown) such that washing water flows between the inner tub 3 and the outer tub 2.

The washing machine 1 may include a water supply conduit 5, which is connected to an external water source such as a faucet so as to supply water into the outer tub 2 and/or the inner tub 3, and a water supply valve 6 for opening and closing the water supply conduit 5. When the water supply valve 6 is opened, the washing water, supplied through the water supply conduit 5, is supplied into the outer tub 2 through a detergent box 32 containing detergent therein.

The washing machine 1 may include a water discharge conduit 9 through which the washing water in the outer tub 2 is discharged, a water discharge valve 8 for opening or closing the water discharge conduit 9, and/or a water discharge pump 15 for pumping the washing water, discharged through the water discharge conduit 9, to the outside of the washing machine 1.

Figure 2:
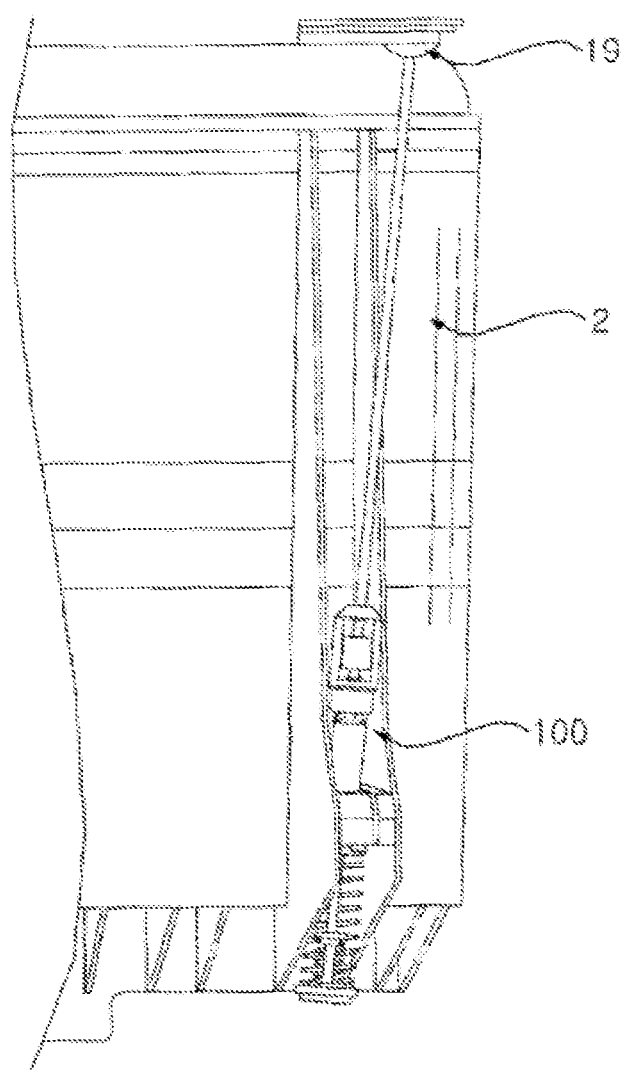
FIG. 2 is a view illustrating a shock-absorbing unit according to an embodiment of the present invention.
Figure 3:
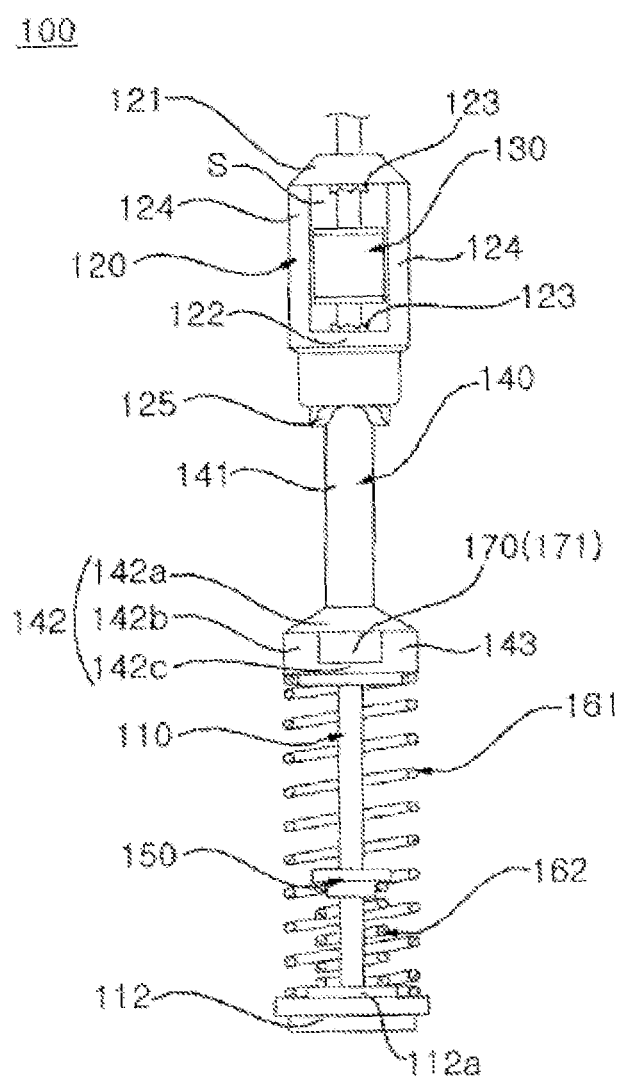
FIG. 3 is a view illustrating the shock-absorbing unit.
Figure 4:
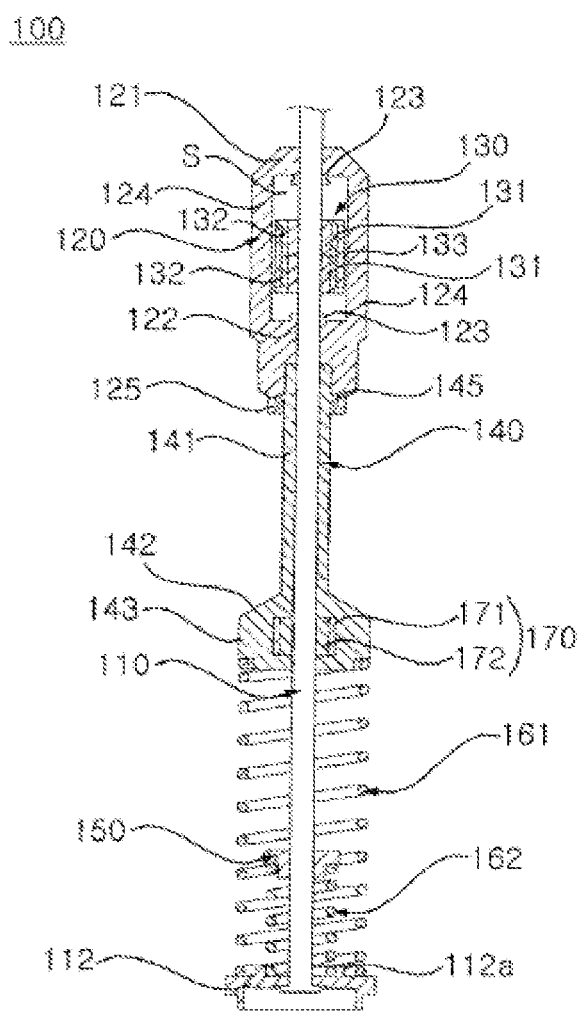
FIG. 4 is a cross-sectional view of the shock-absorbing unit.
Figure 5:
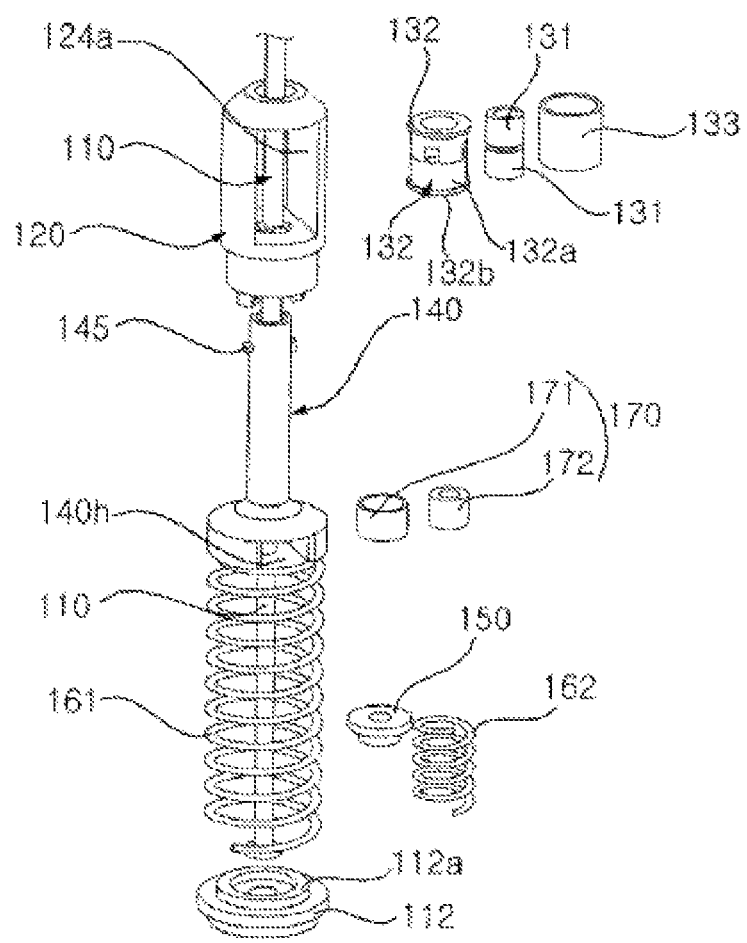
FIG. 5 is an exploded perspective view of the shock-absorbing unit.
Figure 6:
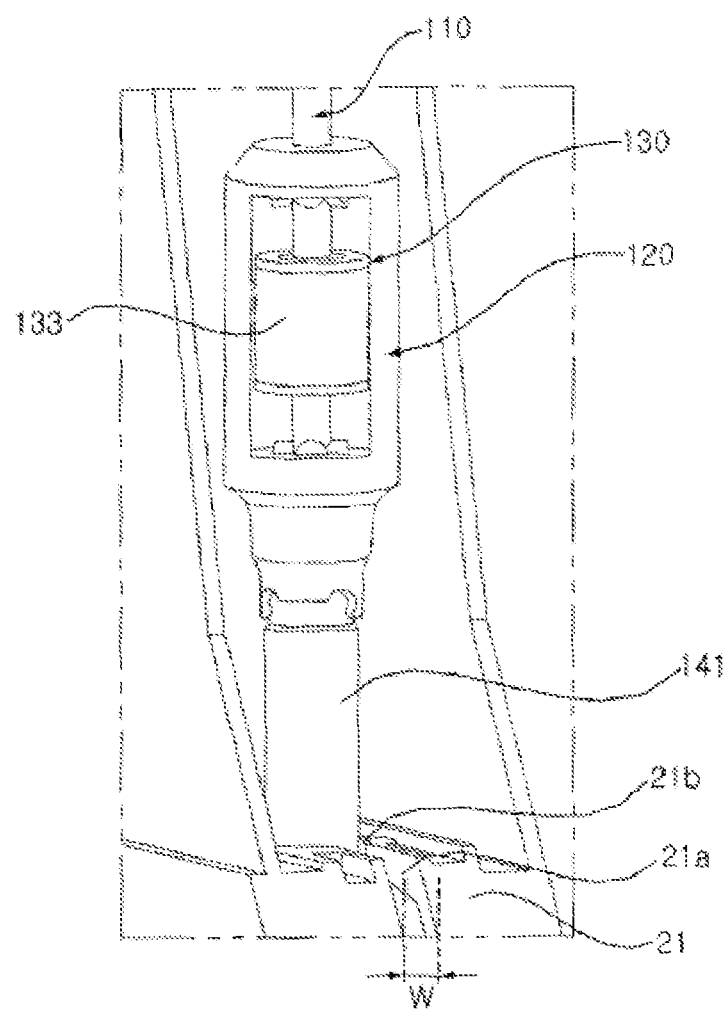
FIG. 6 is a view illustrating the structure in which the shock-absorbing unit is installed on an outer tub.
Figure 7:
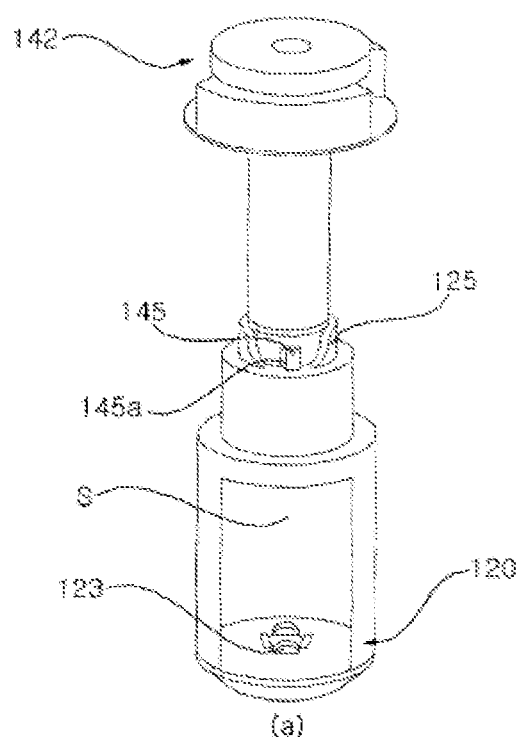
FIG. 7 is a view illustrating a coupling structure between an outer tub support part and a movable part.
Figure 7:
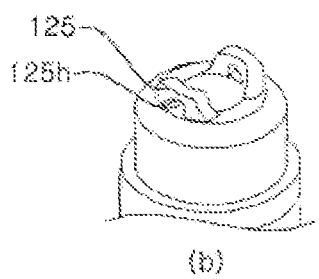

FIG. 2 is a view illustrating a shock-absorbing unit according to an embodiment of the present invention. FIG. 3 is a view illustrating the shock-absorbing unit. FIG. 4 is a cross-sectional view of the shock-absorbing unit. FIG. 5 is an exploded perspective view of the shock-absorbing unit. FIG. 6 is a view illustrating the structure in which the shock-absorbing unit is installed on the outer tub. FIG. 7 is a view illustrating the coupling structure between an outer tub support part and a movable part.

Referring to FIGS. 2 to 7, the washing machine includes the shock-absorbing unit 100 for absorbing vibrations of the outer tub 2.

The shock-absorbing unit 100 includes a support rod 110, which is connected at one end thereof to the casing 10, an outer tub support part 140, which is movable along the support rod 110 and supports the outer tub, at least one elastic member 161 fixedly disposed on the support rod 110 so as to elastically support the outer tub support part 140 from the bottom of the outer tub support part 140, a first friction part 130 disposed above the outer tub support part 140 so as to generate frictional force between the support rod 110 and the first friction part 130, and a housing 120 defining therein a space for accommodating the first friction part, the housing 120 being disposed at the top of the outer tub support part 140 and moving along with the outer tub support part 140 when the outer tub 2 vibrates, and the housing 120 being independently moved alone when the outer tub support part 140 is moved within a predetermined displacement range and being moved while pushing the first friction part 130 when the outer tub support part 140 is moved beyond the predetermined displacement range.

The casing 10 may include a support member 19 connected to the support rod 110. The support rod 110 may be connected to the support member 19 so as to swing or pivot within a predetermined range. The support member 19 may be provided with an opening (not shown) through which the support rod 110 passes. Accordingly, the support rod 110 may be provided at one end thereof with an engaging protrusion (not shown), which is formed to be larger than the opening so as to be caught from above by the support member 19.

The outer tub support part 140 may include a neck 141, which has a longitudinal central hole through which the support rod 110 passes and which has an upper end coupled to the housing 120, and a cap 142, which is provided at the lower end of the neck 141 and is enlarged radially and outwardly. The cap 142 is elastically supported at the lower end thereof by the elastic member 161 and supports the outer tub 2 at the upper end thereof.

Referring to FIG. 6, the outer tub 2 may be provided with a support rod connector 21. The support rod connector 21 may project from the side surface of the outer tub 2. The support rod connector 21 includes a neck receptor 21b through which the neck 141 vertically passes, and an opening 21b opening laterally from the neck receptor 21b. The width W of the opening 21b has to be smaller than the diameter of the neck 141 such that the outer tub support part 140 cannot be laterally separated. The neck receptor 21*b* has to be sized such that the cap 142 cannot pass through the neck receptor 21*b*.

The first friction part 130 may include a soft frictional member 131 for generating frictional force between the support rod 110 and the frictional member 131, and a hard holder 132, which is movable along the support rod 110 and receives therein the frictional member 131. The frictional member 131 may include a plurality of frictional members 131. Correspondingly, the holder 132 may also include a plurality of holders 132.

The frictional member 131 may be made of a soft material such as rubber, a porous fiber material such as felt or non-woven fabric. The frictional member 131 may be fitted over the support rod 110. In this case, frictional force is generated between the inner circumferential surface of the frictional member 131 and the outer circumferential surface of the support rod 110.

Since the frictional member 131, which is made of soft material, has a deformable property whereby the frictional member 131 is deformed by external force, there is a need to firmly hold the frictional member 131 in order to maintain a constant form. In view of this, the frictional member 131 is preferably received in the hard holder 132.

In order to generate sufficient frictional force between the frictional member 131 and the support rod 110, the frictional member 131 has to be in close contact with the support rod 110. To this end, the frictional member 131 is preferably maintained in a somewhat compressed state by being compressed by the holder 132, rather than being maintained in its original form.

One of the first friction part 130 and the housing 120 may be provided with a protrusion 123 projecting from a predetermined surface area thereof. Since there is a collision between the protrusion 123 and a counterpart while the outer tub 2 is deformed due to vibration, there is an effect of being able to reduce impact noise. Specifically, the protrusion 123 may project from a predetermined surface of the housing 120. In this case, since the contact area between the protrusion 123 and the first friction part 130 is reduced, compared to the case where the entire surface area of the housing 120 collides with the first friction part 130, there is an effect of reducing noise.

The housing 120 may include an upper wall portion 121, which pushes downward the first friction part 130 while the outer tub support part 140 is displaced downward, a lower wall portion 122 disposed below the upper wall portion 121 with a predetermined distance therebetween and accommodating therein the first friction part 130, and a plurality of side wall portions 124 disposed between the upper wall portion 121 and the lower wall portion 122 at predetermined intervals so as to connect them to each other. The gap between a pair of adjacent ones of the plurality of side wall portions 124 is preferably sized so as to allow the first friction part 130 to pass therethrough. In this case, the first friction part 130 may be installed in the housing 120 through the gap.

The protrusion 123 may be provided at at least one of the upper wall portion 121 and the lower wall portion 122. The protrusion 123 projects inside the housing 120, that is, into the space S, which accommodates the first friction part 130.

The first friction part 130 may include a pair of frictional members 131 longitudinally arranged along the support rod 110, and a pair of holders 132 respectively receiving the pair of frictional members 131. Each of the pair of holders 132 may include a pipe portion 132*a* in which the frictional member 131 is fitted, and a flange portion 132*b* extending laterally from one end of the pipe portion 132*a*. The pair of holders 132 are coupled to each other at the other ends opposite the one ends having the flange portions 132*b*. Accordingly, the upper and lower ends of the holder assembly constituted by the pair of holders 132 are respectively provided with the flange portions 132*b*. The pair of holders 132 are preferably coupled to each other in a detachable manner. One of the pair of holders 132 may be provided with a hook, and the other of the pair of holders 132 may be provided with a loop, which engages with the hook. For compatibility, the pair of holders 132 may be configured so as to have the same structure. In this case, the hooks and the loops may be alternately arranged along the circumference of the pipe portion 132*a* of each of the holders 132.

The first friction part 130 may include an outer cylindrical pipe 133, which is fitted over the holder 132 and secured between the pair of flange portions 132*b*. The outer pipe 133 may be made of a magnetic material, for example, metal.

One of the housing 120 and the outer tub support part 140 may be provided with a coupling protrusion 145, and the other of the housing 120 and the outer tub support part 140 may be provided with a coupling loop 125 having a hole 125*h* with which the coupling protrusion 145 engages. The coupling protrusion 145 may include a plurality of coupling protrusions. In this case, the coupling loops 125 may also include a plurality of coupling loops corresponding in number to the number of coupling protrusions 145. The engagement between the coupling protrusion 145 and the coupling loop 125 may be achieved by relative rotation between the housing 120 and the outer tub support part 140 about the support rod 110. In coupling between the housing 120 and the outer tub support part 140, regardless of the locations between the coupling loops 125 at which the coupling protrusions 145 are positioned, the coupling protrusions 145 may be engaged with the coupling loops 125 by a simple manipulation of rotating the housing 120 or the outer tub support part 140, thereby providing an advantage of making assembly easy. The coupling protrusion may be provided with an inclined surface 145*a* such that the coupling loop 125 can smoothly be fitted over the coupling protrusion when the housing 120 or the outer tub support part 140 is rotated.

The inner tub 3 may be rotated in an unbalanced state while the outer tub 3 is rotated about a fixed axis. Hence, a force capable of causing torsion or twisting of the neck 141 may be applied to the neck 141. Accordingly, because an intensive frictional force is applied between the first friction part 130 and the support 110, the force of causing twisting may lower the rigidity of the neck 141. Therefore, the length of the neck 141 has to be set to be equal to or greater than a length at which twisting is sufficiently resisted.

The shock-absorbing unit 100 may further include a second friction part 170, which is fixedly disposed relative to the cap 142 so as to create frictional force between the support rod 110 and the second friction part 170 upon vibration of the outer tub 2. The second friction part 170 may include a cylindrical housing 171 and a frictional member 172 disposed in the housing 171 so as to create frictional force between the support rod 110 and the frictional member 172.

The cap 142 may include an upper wall portion 142*a* for supporting the outer tub 2, a lower wall portion 142*b* spaced apart from the upper wall portion 142*a* and elastically supported by the elastic member 161, and a plurality of side wall portions 142*c*, which are disposed between the upper wall portion 142*a* and the lower wall portion 142*b* and are circumferentially spaced apart from each other at intervals so as to connect the upper wall portion 142a to the lower wall portion 142b. The spacing between a pair of adjacent ones of the plurality of side wall portions 142c is preferably sized so as to allow the second friction part 170 to pass therethrough.

The shock-absorbing unit 100 may include a first spring 161 and a second spring 162, which are concentrically arranged. The second spring 162 begins to be compressed after the first spring 161 has been compressed to a predetermined extent by being pushed by the outer tub support part 140. Accordingly, when displacement of the outer tub 2 due to vibration is within a predetermined range, the shock-absorbing function is fulfilled only by the first spring 161. Meanwhile, when displacement of the outer tub 2 exceeds the predetermined range, the shock-absorbing function is fulfilled by both the first spring 161 and the second spring 162. Consequently, the shock-absorbing function can be efficiently fulfilled even when excessive vibration of the outer tub 2 is generated due to resonance, thereby assuring the endurance and stability of the washing machine.

The shock-absorbing unit 100 may further include a movable member 150, which is movable along the support rod 110 and is elastically supported by the second spring 162. The movable member 150 is moved by the outer tub support part 140 after the first spring 161 has been compressed to a predetermined extent.

The second spring 162 may be disposed inside the first spring 161. The first spring 161 and the second spring 162 may be supported by a common base 112. In this case, the second spring 162 has a shorter length than the first spring 161. Hence, after the first spring 161 is compressed by the length difference between the first spring 161 and the second spring 162, the second spring 162 begins to be compressed along with the first spring 161.

The support rod 110 may be provided at the lower end thereof with the base 112 by which the first spring 161 and/or the second spring 162 is supported. The base 112 may be provided with an annular partition wall 112a projecting from the surface thereof that is in contact with the first spring 161. The first spring 161 may be disposed such that the partition wall 112a is positioned inside the first spring 161, and the second spring 162 may be disposed inside the partition wall 112a. In order for the second spring 162 to be firmly held without shaking, the partition wall 112a may preferably have an inner diameter that is substantially equal to the outer diameter of the second spring 162.

After completion of assembly, at least one of the first spring 161 and the second spring 162 is preferably coupled to the base 112 so as to prevent rotation of the at least one spring about the support rod 110. The base 112 may be provided with a holder (not shown) for holding the end of the spring 161. The end of the spring may be engaged with the holder in a rotating manner. In this case, the spring 161 is gradually engaged with the holder from the end thereof as the spring 161 is rotated in one rotational direction. When the spring 161 cannot be rotated any further, the engagement between the spring and the holder may be completed.

The first spring 161 and the second spring 162 are preferably arranged in a concentric manner such that the elastic force of the first spring 161 or the second spring 162 is precisely exerted in the longitudinal direction of the support rod 110. In this case, the first spring 161 and the second spring 162 define concentric circles when viewed in horizontal section.

Figure 8:
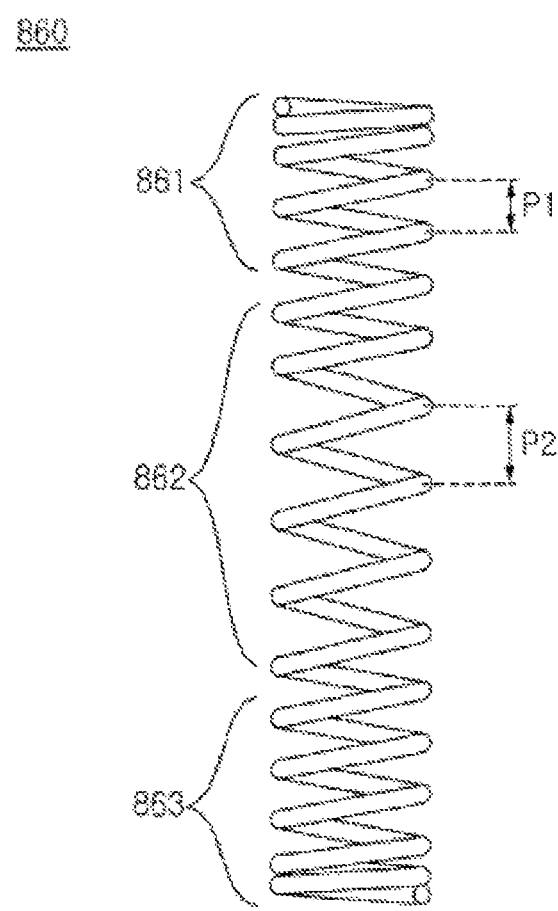
FIG. 8 is a view illustrating an irregular pitch spring.

The elastic member constituting the shock-absorbing unit may have a modulus of elasticity that varies in a non-linear fashion according to a load. An example of the elastic member is an irregular pitch spring 860 (see FIG. 8), which has sections having different pitches.

Figure 9:
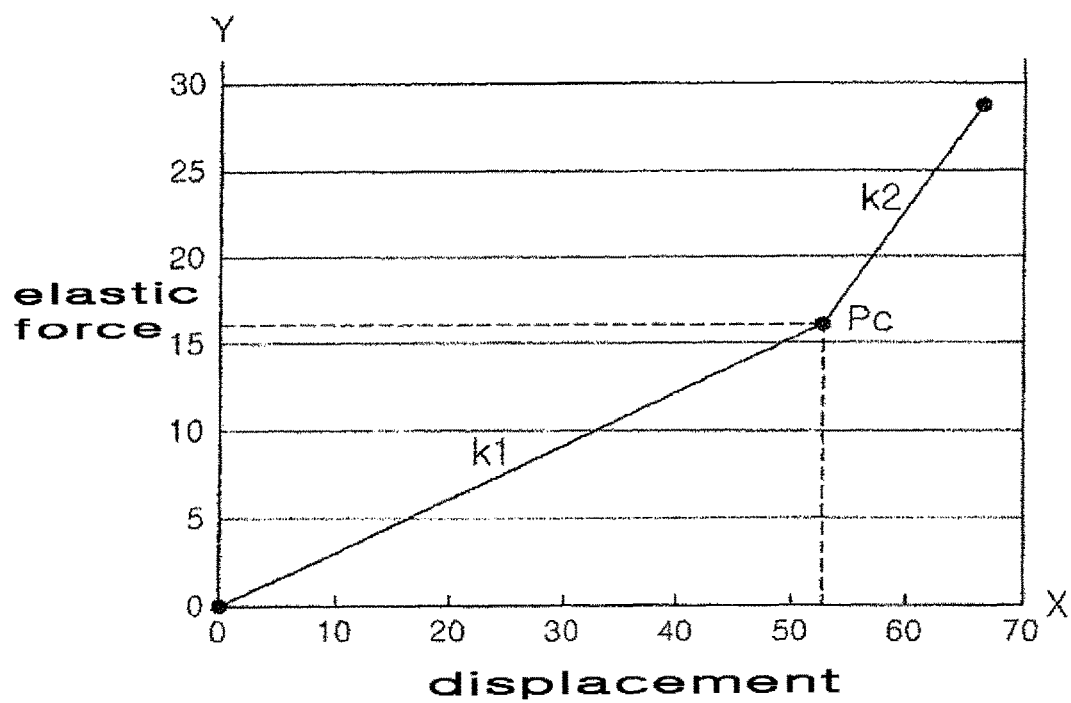
FIG. 9 is a graph illustrating variation in elastic force with displacement of the outer tub, in a structure in which a pair of springs are concentrically provided in the shock-absorbing unit.

In the case where two springs 161 and 162 are provided as described above, the elastic force (or restoring force, Y-axis) with displacement (X-axis) of the outer tub 2 (or the outer tub support part 140) increases at a constant inclination k1 within a section in which the shock-absorbing function is fulfilled only by one spring 161, and then linearly increases in a different inclination k2 from the point Pc at which the shock-absorbing function is fulfilled by both the springs 161 and 162, as illustrated in FIG. 9.

Meanwhile, in the case where the irregular pitch spring 860 is applied (see FIG. 8), the increase in elastic force (Y-axis) with displacement of the outer tub 2 continuously changes in inclination in a nonlinear manner. Consequently, the shock-absorbing function may be more smoothly fulfilled throughout the entire range in which the outer tub 2 is displaced. The irregular pitch spring 860 may include a first section 861 extending at a certain pitch P1 and a second section 862 having a pitch P2 different from the first section 861. In some embodiments, the irregular pitch spring 860 may include more sections, adjacent sections having different pitches. In this embodiment, a third section 863 is further provided under the second section 862. Although the third section 863 may have the same pitch as the first section 861, there is no need for it to be limited thereto. Among the first section 861, the second section 862 and the third section 863, the first section preferably has the greatest pitch P2.

Figure 10:
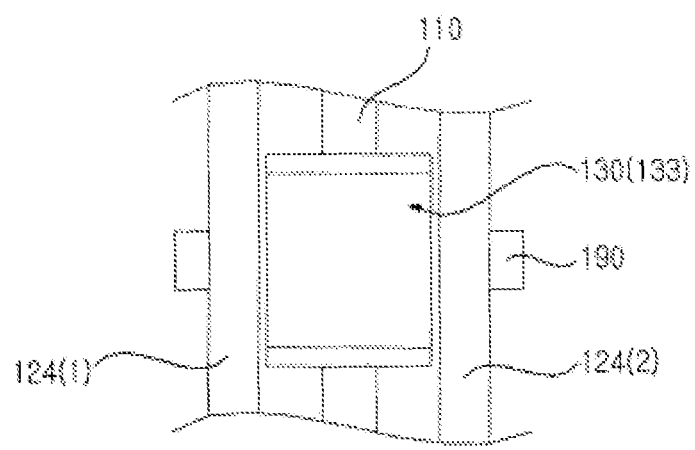
FIG. 10 is a view illustrating another embodiment of the shock-absorbing unit.

FIG. 10 is a view illustrating another embodiment of the shock-absorbing unit. Referring to FIG. 10, this embodiment may include at least one magnet 190, which causes attractive force attributable to a magnetic field between the first friction part 130 and the housing 120 in a direction perpendicular to the direction in which the first friction part 130 is displaced. In this embodiment, the magnet 190 may be disposed on the housing 120, and the first friction part 130 may be provided with metal capable of creating attractive force due to the relationship between the magnet 190 and the metal. The pipe 133 may be preferably made of the metal. Examples of the metal may include iron such as steel use stainless (SUS), nickel, cobalt and the like.

The first friction part 130 may be reliably moved along the support rod 110 without lateral shaking by means of the attractive force acting between the magnet 190 and the first friction part 130.

Specifically, it is preferable that the magnetic force from the magnet 190 act symmetrically with respect to the longitudinal axis of the support rod 110. To this end, the magnet 190 may be preferably configured to have the shape of a band or annulus surrounding the side wall portion 124 of the housing 120, or may be preferably constituted by a plurality of magnets, which are symmetrically arranged.

It is preferable that the first friction part 130 be spaced apart from the magnet 190 with a predetermined distance therebetween so as to cause indirect action of magnetic force, rather than being in contact with the magnet 190 so as to cause direct action of magnetic force. The magnet 190 may be disposed on the outer circumferential surface of the side wall portion 124 of the housing 120. In FIG. 10, the side wall portion includes a side wall portion 124(1) and a side wall portion 124(2), which are arranged to be symmetrical with each other.

Figure 11:
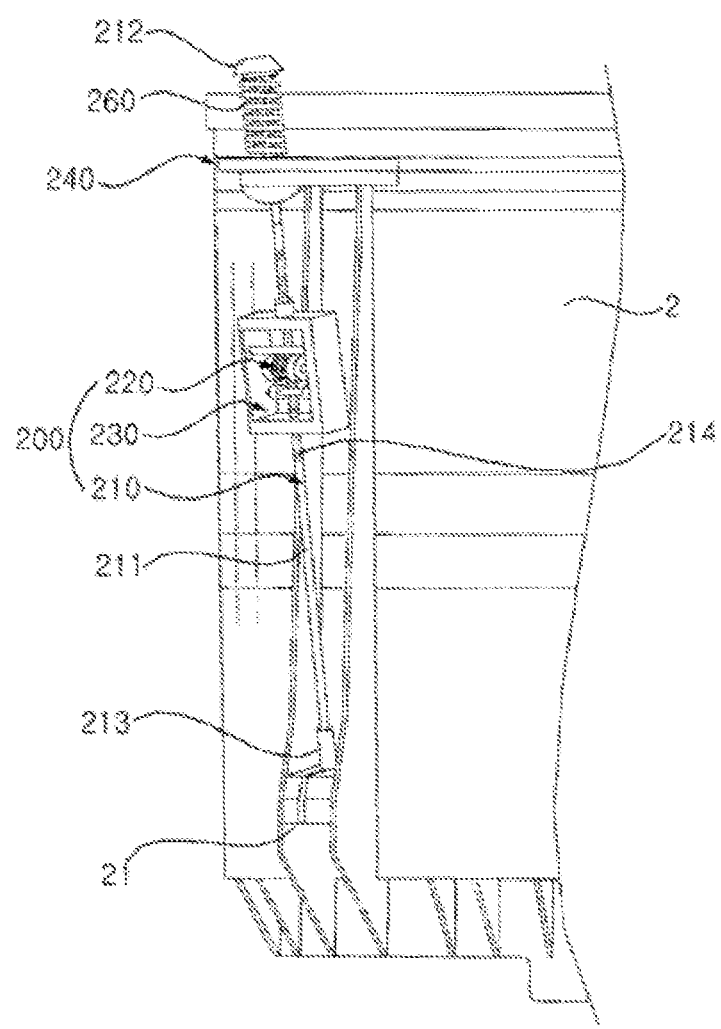
FIG. 11 is a view illustrating a shock-absorbing unit according to another embodiment of the present invention.
Figure 12:
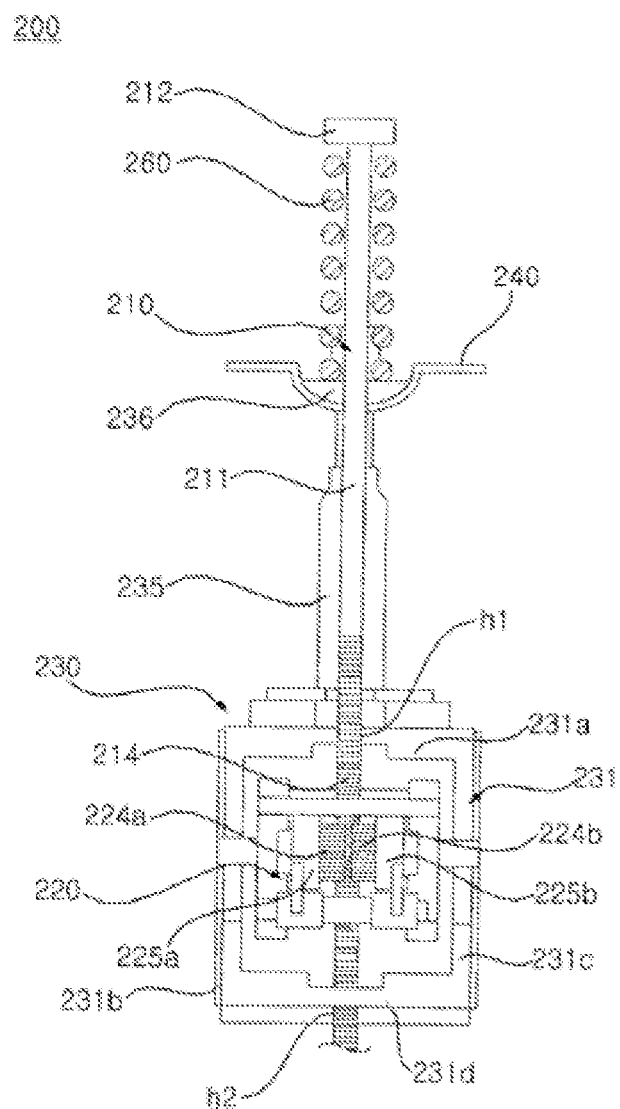
FIG. 12 is a view illustrating the shock-absorbing unit shown in FIG. 11.
Figure 13:
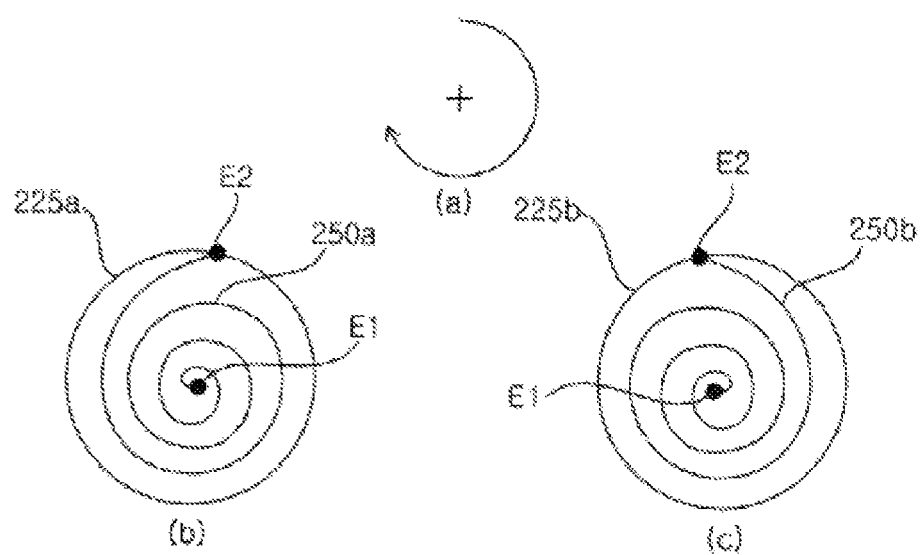
FIG. 13 is a view illustrating the action of a first torsion spring and a second torsion spring in response to the rotation of pinions, in which (a) shows the rotational direction of the pinions, (b) shows the installation structure of the first torsion spring, and (b) and (c) are viewed from the left to the right in FIG. 12.

FIG. 11 is a view illustrating a shock-absorbing unit 200 according to another embodiment of the present invention. FIG. 12 is a view illustrating the shock-absorbing unit 200 shown in FIG. 11. FIG. 13 is a view illustrating the action of a first torsion spring 250a and a second torsion spring 250b by rotation of pinions 224a and 224b, in which (a) shows the rotational direction of the pinions 224a and 224b, (b) shows the installation structure of the first torsion spring 250a, and (c) shows an installation structure of the second torsion spring 250b. In this figure, (b) and (c) are viewed from the left to the right in FIG. 12.

Referring FIGS. 11 to 13, the washing machine according to the embodiment of the present invention may include a shock-absorbing unit 200 for absorbing vibrations of the outer tub 2.

The shock-absorbing unit 200 may include a rack 214 extending vertically, one or more pinions 224 and 224b, which are rotated by cooperation with the rack 214, and one or more torsion elements 250a and 250b, which are torsionally deformed so as to dampen the rotational movement of the pinions 224a and 224b when the pinions 224a and 224b are rotated. Although a pair of pinions 224a and 224b are shown in the attached drawing, only one of the pair of pinions 224a and 224b may alternatively be provided, without being limited thereto.

More specifically, the shock-absorbing unit 200 may include an outer tub support part 210 for supporting the outer tub 2 in a suspended state in the casing 10, and a torsional damper 220 for generating torsional moment as the outer tub 2 vibrates. One of the outer tub support part 210 and the torsional damper 220 may be provided with the rack 214, and the other of the outer tub support part 210 and the torsional damper 220 may be provided with the pinions 224a and 224b. Hereinafter, an example in which the outer tub support part 110 is provided with the rack 214 and the torsional damper 220 is provided with the pinions 224a and 224b will be described.

One end of the outer tub support part 210 may be supported by the casing 10, and the other end of the outer tub support part 210 may include a support rod 211 connected to the lower portion of the outer tub 2. The casing 10 may include a support member 240 for supporting one end of the support rod 211. The support member 240 may be integrally formed with the cabinet 11 or the top cover 12, or may be formed as a separate component and coupled to the cabinet 11 or the top cover 12.

The support member 240 may have an opening through which the support rod 211 passes. Therefore, one end of the support rod 211 may project upward through the opening. The support rod 211 may be provided at one end thereof with a support protrusion 212. The support rod 211 may be provided at the other end thereof with an outer tub connector 213 connected to the outer tub 2. The outer tub 2 may be provided with the support rod connector 21, which engages with the outer tub connector 213. The support rod connector 21 may be provided at the lower portion of the outer tub 2 so as to project from the outer surface of the outer tub 2. The support rod connector 21 is partially opened at a side surface thereof so as to allow the support rod 211 to be inserted therethrough. The support rod 211, which is inserted through the opened portion, engages at the lower end thereof with the bottom surface of the support rod connector 21.

At least one spring 260, which is inserted over the support rod 211 and is disposed between the support member 240 and the support protrusion 212, may be further provided. The spring 260 is supported at the lower end thereof by the support member 240, and elastically supports the support protrusion 212 at the upper end thereof.

The support rod 211 may be provided with the rack 214. The rack 214 may be integrally formed with the support rod 211, or may be formed as a separate component and coupled to the support rod 211. The rack 214 is preferably disposed within a range such that the rack 214 is always in engagement with the pinions 224a and 224b when the outer tub 2 vibrates.

The torsional damper 220 may include containers 225a and 225b, which accommodate the torsion elements 250a and 250b therein, and the pinions 224a and 224b, which are rotated about a rotating shaft passing through the containers 225a and 225b.

A holding part 230 for holding the position of the torsional damper 220 relative to the support member 240 may be provided. The holding part 230 may include a cylinder 235, which has an elongate hole, through which the support rod 111 passes, and which is provided at the upper end thereof with an engaging portion 236 coupled thereto, and a holding frame 231, which is connected to the lower end of the cylinder 235 so as to hold the torsional damper 220.

The holding frame 231 is coupled to the lower end of the cylinder 235, and has one or more openings h1 and h2 through which the support rod 211 passes. In this embodiment, the upper opening h1, through which the support rod 211 passes, is formed in an upper frame 231a connected to the lower end of the cylinder 235, side frames 231b and 231c extend downward from opposite lateral sides of the upper frame 231b, and the lower opening h2, through which the support rod 211 passes, is formed in a lower frame 231d connecting the pair of side frames 231b and 231b to each other. The torsional damper 220 may be disposed in the space defined by the frames, and may be fixedly coupled to the side frames 231b and 231c.

Since the torsional damper 220 is disposed in the inner region surrounded by the holding frame 231, it is possible to prevent the torsional damper 220 from colliding with the outer tub 2 or the casing 10.

The torsion elements 250a and 250b is made of a deformable elastic member so as to be twist-deformed by rotation of the pinions 224a and 224b. In particular, the torsion elements are elastically deformed, thereby creating a torsional resisting moment. The torsion elements 250a and 250b may include helical torsion springs, elastic torsion bars, which are deformed in section by external force, or the like. Hereinafter, an example in which the torsion elements 250a and 250b are embodied as torsion springs will be described.

The rotational direction of the pinions 224a and 224b when the outer tub 2 is moved downward during vibration thereof is opposite to the rotational direction of the pinions 224a and 224b when the outer tub 2 is moved upward during vibration thereof. Accordingly, the torsion springs 250a and 250b may be twisted upon increase in downward displacement of the outer tub 2 and may be untwisted upon increase in upward displacement of the outer tub 2, depending on the manner in which the torsion springs are installed. In contrast, the torsion springs 250a and 250b may be twisted upon increase in upward displacement of the outer tub 2 and may be untwisted upon increase in downward displacement of the outer tub 2, depending on the manner in which the torsion springs are installed.

Since the outer tub 2 is always subjected to force in the direction of gravitational force attributable to the load of laundry or water as well as its intrinsic weight, it is important to address drooping of the outer tub 2. Therefore, at least one of the torsion springs 250a and 250b is preferably installed so as to be twisted when the outer tub 2 is displaced downward.

The torsion springs 250a and 250b may include a plurality of torsion springs. In this case, there may be provided the first torsion spring 250a and the second torsion spring 250b, which create a torsional resisting moments in different directions when the pinions 224a and 224b are rotated in one direction. For example, when the outer tub 2 is displaced downward, the first torsion spring 250a is twisted, thereby serving as a resistor for dampening the downward displacement. In contrast, when the outer tub 2 is displaced upward, the second torsion spring 250b is twisted, thereby serving as a resistor for dampening upward displacement.

More specifically, referring to FIGS. 12 and 13, the first torsion spring 250a is accommodated in the first container 225a, and the second torsion spring 250b is accommodated in the second container 225b. One end E1 of each of the torsion springs 250a and 250b may be coupled to the rotating shaft of the pinion 224a or 224b, and the other end E2 of each of the torsion springs 250a and 250b may be coupled to the container 225a or 225b. In this arrangement, when the pinions 224a and 224b are rotated in a positive (+) direction while moving downward along the rack 214, the second torsion spring 250b is twisted, thereby creating a torsional resisting moment in a negative (−) direction. In contrast, when the pinions 224a and 224b are moved along the rack 214, the pinions 224a and 224b are rotated in a negative (−) direction, and the first torsion spring 224a is twisted, thereby creating a torsional resisting moment in a positive (+) direction. Accordingly, when the outer tub 2 vibrates, a predetermined level or higher of shock-absorbing force may always be applied, regardless of the direction in which the outer tub 2 is displaced.

Although the first torsion spring 250a and the second torsion spring 250b may be operated via the rotation of a single common pinion, the first pinion 224a, associated with the first torsion spring 250a, and the second pinion 224b, associated with the second torsion spring 250b, may be provided, as in this embodiment. In this case, the first pinion 224a and the second pinion 224b may include a common rotating shaft.

Figure 14:
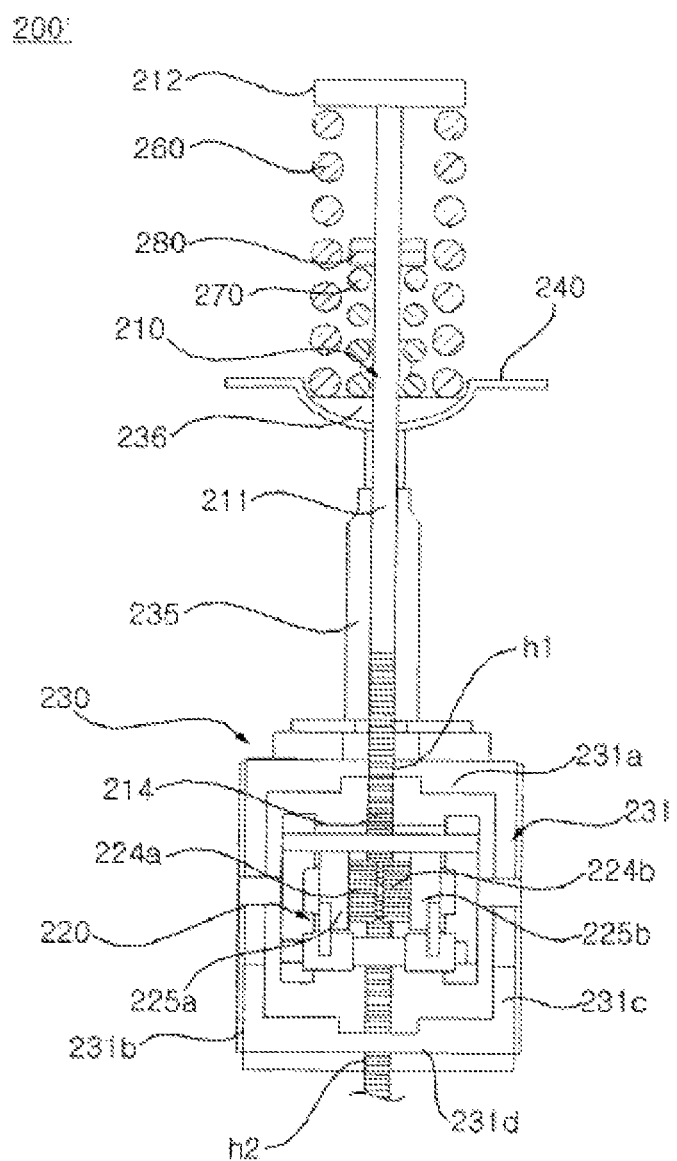
FIG. 14 is a view illustrating a shock-absorbing unit according to still another embodiment of the present invention.

FIG. 14 is a view illustrating a shock-absorbing unit 200' according to a still another embodiment of the present invention. Hereinafter, the same components as those of the previous embodiments will be denoted by the same reference numerals, and descriptions thereof are omitted by adopting those of the previous embodiments.

Referring FIG. 14, the shock-absorbing unit 200' may include a first spring 260, and a second spring 270, which is concentrically arranged with respect to the first spring 260 and which begins to be deformed when the first spring 260 is deformed to a predetermined level or higher. The first spring 260 and the second spring 270 may have different moduli of elasticity.

When the displacement of the outer tub 2 attributable to vibration is lower than a predetermined value, the shock-absorbing function is fulfilled only by the first spring 260, which is compressed by the support protrusion 212. When the displacement of the outer tub 2 exceeds the predetermined value, the shock-absorbing function is fulfilled by both the first spring 260 and the second spring 270. A movable member 280 may be provided so as to be moved along the support rod 211 between the support member 240 and the support protrusion 212. The movable member 280 is elastically supported by the second spring 270. When the displacement of the outer tub 2 exceeds the predetermined value, the movable member 280 is moved by the support protrusion 212, thereby compressing the second spring 270. When the pressure applied to the movable member 280 by the support protrusion 212 is released by reversal of the direction of movement of the outer tub 2, the movable member 280 is returned to its normal position by the restoring force of the second spring 270.

The second spring 270 may have a smaller diameter than the first spring 260. In this case, the second spring 270 is disposed inside the second spring 270. The second spring 270 may also be configured to be shorter than the first spring 260.

When the displacement of the outer tub 2 attributable to vibration thereof is within a relatively small range, the shock-absorbing function is fulfilled only by the first spring 260, among the first spring 260 and the second spring 270. Accordingly, appropriate shock-absorbing force is applied during the generation of smaller vibrations. In contrast, when the displacement of the outer tub 2 increases beyond the small range, the shock-absorbing function is fulfilled by both the first spring 260 and the second spring 270, thereby enhancing stability in the event of excessive vibration.

Since the laundry treatment apparatuses according to the embodiments, which have been described with reference to FIGS. 11 to 14, are configured to fulfill a shock-absorbing function by means of the torsion elements, which are twisted by displacement of the outer tub, there is an effect of easily changing the direction of the torsional resisting moment, depending on the arrangement of the torsion elements.

Figure 15:
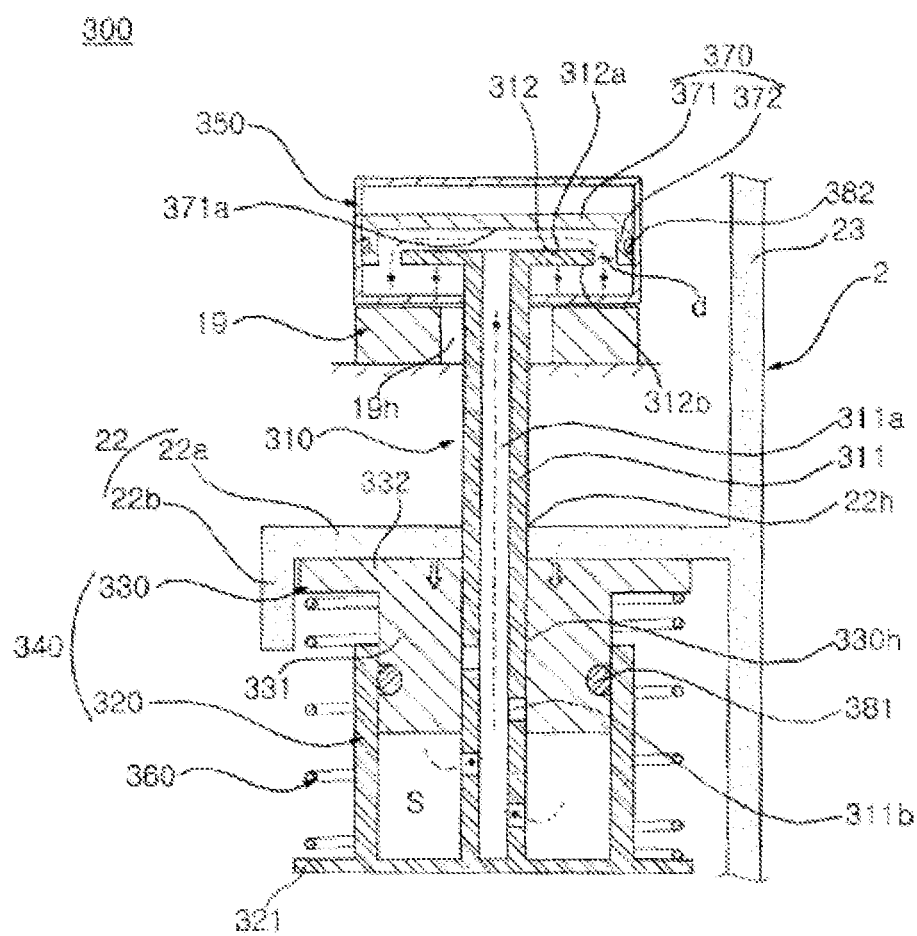
FIG. 15 is a view illustrating a shock-absorbing unit according to a further embodiment of the present invention.

FIG. 15 is a view illustrating a shock-absorbing unit according to a further embodiment of the present invention. Referring to FIG. 15, a washing machine according to the further embodiment of the present invention may include the shock-absorbing unit 300 for absorbing vibration of the outer tub 2.

The shock-absorbing unit 300 may include a support rod 310, a first fluid container 340 and a second fluid container 350.

The support rod 310 is suspended in the casing, and is connected to the outer tub 2. When the outer tub 2 is displaced upward or downward due to vibrations, the support rod 310 is correspondingly displaced in the same direction as the outer tub 2.

The first fluid container 340 contains fluid therein, and the amount of fluid contained in the first fluid container 340, that is, the housing capacity C, is changed due to the vibration of the outer tub 20. The housing capacity may decrease when the outer tub 2 is displaced downward (ΔC<0), and may increase when the outer tub 2 is displaced upward (ΔC>0). The variation in housing capacity of the first fluid container 340 (ΔC), that is, the capacity variation is discharged from or introduced into the first container 340.

An amount of fluid equal to the variation amount (ΔC) is circulated between the second fluid container 350 and the first fluid container 340. Specifically, when the housing capacity of the first fluid container 340 decreases, an amount of fluid equal to the decreased variation amount is transferred from the first fluid container 340 to the second fluid container 350 (see the direction of the arrow in FIG. 15). In contrast, when the housing capacity of the first fluid container 340 increases, an amount of fluid equal to the increased variation amount is transferred from the second fluid container 350 to the first fluid container 340.

The support rod 310 is provided at the end thereof with a dynamic pressure actuator 312, which is movably disposed in the second fluid container 350 so as to exert the dynamic pressure of the fluid in the second fluid container 350 in the direction opposite the direction in which the outer tub 2 moves. The dynamic pressure is caused by circulation of fluid between the first fluid container 340 and the second fluid container 350. Positive pressure is applied to the dynamic pressure actuator 312 when fluid is transferred from the first fluid container 340 to the second fluid container 350, and negative pressure is applied to the dynamic pressure actuator 312 when the fluid is transferred from the second fluid container 350 to the first fluid container 340. Specifically, when the outer tub 2 is displaced downward due to the vibration thereof, positive pressure is applied to the dynamic pressure actuator 312 from the fluid in an upward direction, that is, in the direction in which the fluid supports the dynamic pressure actuator 312 (see the direction of the arrow in FIG. 15). As a result, the downward movement of the support rod 310 is attenuated due to the positive pressure, and the downward movement of the outer tub 2 is correspondingly attenuated. In contrast, when the outer tub 2 is displaced upward, negative pressure is applied to the dynamic pressure actuator 312 from the fluid. As a result, the upward movement of the support rod 310 is attenuated, and the upward movement of the outer tub 2 is correspondingly attenuated.

In this way, the housing capacity of the first fluid container 340 varies due to the vibration of the outer tub 2, and the variation in the housing capacity of the first fluid container 340 causes the transfer of an amount of fluid corresponding to the variation amount. Since the dynamic pressure caused by the variation in the housing capacity serves in turn to attenuate the displacement of the support rod 310, the vibration of the outer tub 2, which is connected to the support rod 310, is also attenuated, thereby improving the stability of the entire system.

The shock-absorbing unit 300 may include a fluid channel, which enables fluid to be circulated between the first fluid container 340 and the second fluid container 350. The fluid channel, which is intended to establish communication between the first fluid container 340 and the second fluid container 350, may be embodied in various fashions. Hereinafter, although an example in which the fluid channel is formed in the support rod 310 will be described, the fluid channel may be formed separately from the support rod 310, without being limited thereto.

The support rod 310 may include a pipe portion defining a longitudinal central hole 311a, and the circulation of fluid between the first fluid container 340 and the second fluid container 350 may be achieved through the central hole 311a. The support rod 310 may be at least partially disposed in the first fluid container 340, and the pipe portion 311 may be provided with a flow opening 311b, which allows the space in the first fluid container 340 to communicate with the central hole 311a.

The first fluid container 340 may include a cylinder 320 having an open upper end, and a piston 330, which defines, in conjunction with the cylinder 320, a space S for containing fluid therein and which is movable with respect to the cylinder 320. The piston 330 is integrally formed with the outer tub 2, and the volume of the space S corresponding to the housing capacity of the first fluid container 340 varies as the piston 330 moves.

The casing 10 may include a support member 19 for supporting the second fluid container 340. The support member 19 may be integrally formed with the casing 10, or may be formed separately from the casing 10 and may be coupled to a constituent component thereof. The support member 19 may be provided with a through hole 19h, through which the pipe portion 311 passes. The pipe portion 311 may be disposed at the lower end thereof inside of the first fluid container 340 below the support member 19, and may be disposed at the upper end thereof inside the second fluid container 350 on the support member 19. The pipe portion 311 may pass through the piston 330, and may be connected to the cylinder 320 in the space S. The piston 330 may be provided with a through hole 330h through which the pipe portion 111 passes.

The pipe portion 311 may be provided at the upper end thereof with the dynamic pressure actuator 312. The dynamic pressure actuator 312 may be integrally formed with the pipe portion 311, or may be separately formed and may be coupled to the pipe portion 311. The dynamic pressure actuator 312 may be constituted by a plate body, which is enlarged radially and outwardly from the upper end of the pipe portion 311.

The outer tub 2 may be provided with a piston connector 22. The piston connector 22 may include a connecting protrusion 22a, which projects outward from the outer tub 2 and is supported by the piston 330. The connecting protrusion 22a may be provided with a through hole 22h at a position corresponding to the through hole 330h so as to allow the support rod 310 to pass therethrough. The piston protrusion 22 may further include a partition wall 22b, which extends downward from the outer end of the connecting protrusion 22a. The piston 330 may be firmly supported by the partition wall 22b even when the support rod 310 is pivoted with respect to the through hole 22h.

The shock-absorbing unit 300 may further include an elastic member 360, which is fixedly disposed on the cylinder 320 so as to elastically support the piston 330. The elastic member 360 may be embodied as a spring. The piston 330 may include a piston body 331, which is movable in the cylinder 320, and a plate 332, which extends laterally from the upper end of the piston body 331.

A support protrusion 322 may extend outward from the lower end of the cylinder 320 to support one end of the elastic member 360. In this case, the cylinder 320 is disposed inside the elastic member 360, and the upper end of the elastic member 360 supports the plate 332 of the piston 330.

However, the elastic member 360 may be disposed inside the cylinder 320, without being limited thereto. In this case, there is no need to provide the plate 332, and the elastic member 360 is supported by the bottom of the cylinder 320 so as to elastically support the piston 330. When the outer tub 2 is displaced downward, the piston 330 presses the elastic member 360, thereby compressing the elastic member 360. In contrast, when the outer tub 2 is displaced upward, the elastic member 360 is restored to its normal position by its own elastic force.

The shock-absorbing unit 300 may further include a flow guide 370 disposed inside the second fluid container 350. When the housing capacity of the first fluid container 340 is reduced, the flow guide 370 serves to guide fluid, which is introduced into the second fluid container 350 through the pipe portion 111, in the downward direction of the dynamic pressure actuator 312.

The flow guide 370 may be disposed above the dynamic pressure actuator 312. The flow guide 370 may include a partition plate 371 for dividing the second fluid container 350 into upper and lower parts, and a side wall 372, which projects from the circumferential edge of the partition plate 371 and is movable along the inner circumference surface of the second fluid container 350.

The fluid, which is introduced into the second fluid container 350 from the first fluid container 340 through the pipe portion 311, flows in a lateral direction between the dynamic pressure actuator 312 and the flow guide 370. Specifically, the fluid is discharged toward the lower surface 371a of the flow guide 370 from the pipe portion 311. After colliding with the lower surface 371a of the flow guide 370, the fluid flows in a lateral direction between the lower surface 371a of the flow guide 370 and the upper surface 312a of the dynamic pressure actuator 312.

The fluid, which has flowed in the lateral direction, is turned downward in flow direction, thereby applying pressure to the lower surface of the dynamic pressure actuator 312, particularly to the lower surface 371a of the partition plate 371. To this end, a distance d may be defined between the dynamic pressure actuator 312 and the second fluid container 350 (or between the dynamic actuator 312 and the flow guide 370). The fluid, which has flowed in the lateral direction between the flow guide 370 and the dynamic pressure actuator 312, is turned downward and flows through the distance d. As a result, dynamic pressure is finally applied to the lower surface 312b of the dynamic pressure actuator 312. The flow guide 370 may be moved by the hydraulic pressure in the second fluid container 350.

The shock-absorbing unit 300 may further include a seal 382 for sealing the gap between the flow guide 370 and the second fluid container 350. Although the seal 382 is preferably constituted by a soft O-ring, the present invention is not limited thereto. The seal 382 may be secured to the outer circumferential surface of the flow guide 370 (e.g. the outer circumferential surface of the side wall 372) or the inner circumferential surface of the second fluid container 350.

The shock-absorbing unit 300 may further include a seal 381, which seals the clearance between the piston 330 and the cylinder 320 to prevent the leakage of fluid from the first fluid container 340. Although the seal 381 is preferably constituted by a soft O-ring, the present invention is not limited thereto. The seal 381 may be secured to the outer circumferential surface of the piston 330 or the inner circumferential surface of the cylinder 320.

Although the first fluid container 340 is disposed under the outer tub 2 in this embodiment, it may also be disposed above the outer tub 2 in some embodiments, without being limited thereto.

Figure 16:
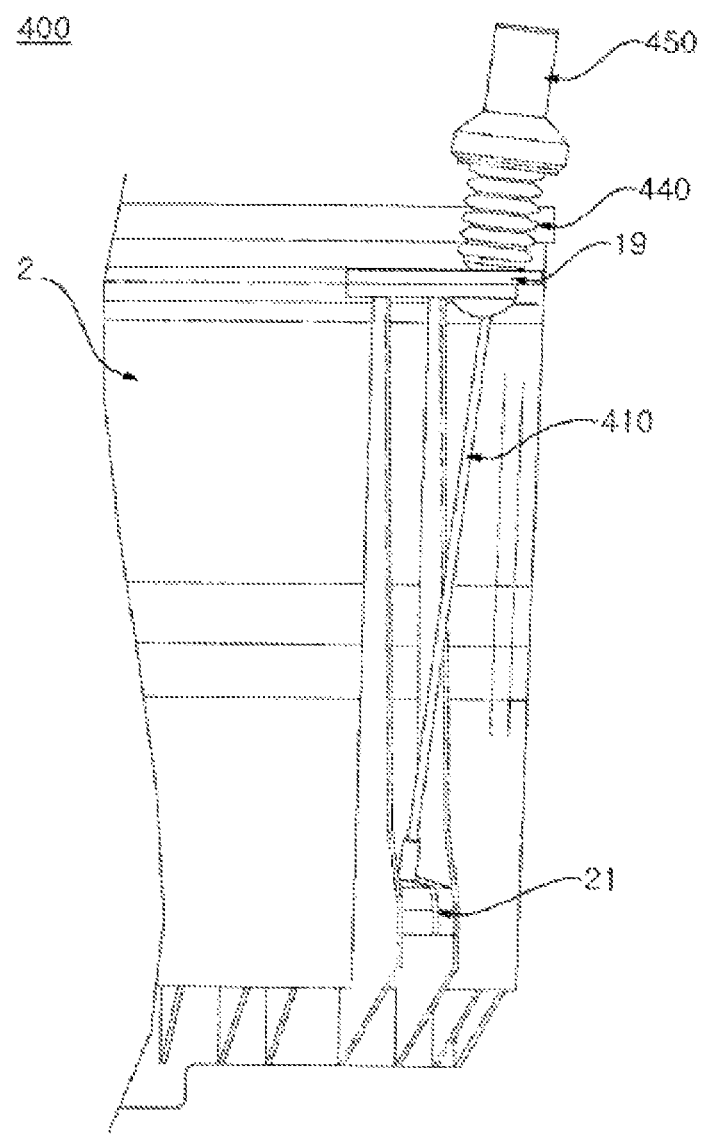
FIG. 16 is a view illustrating a shock-absorbing unit according to a further embodiment of the present invention.
Figure 17:
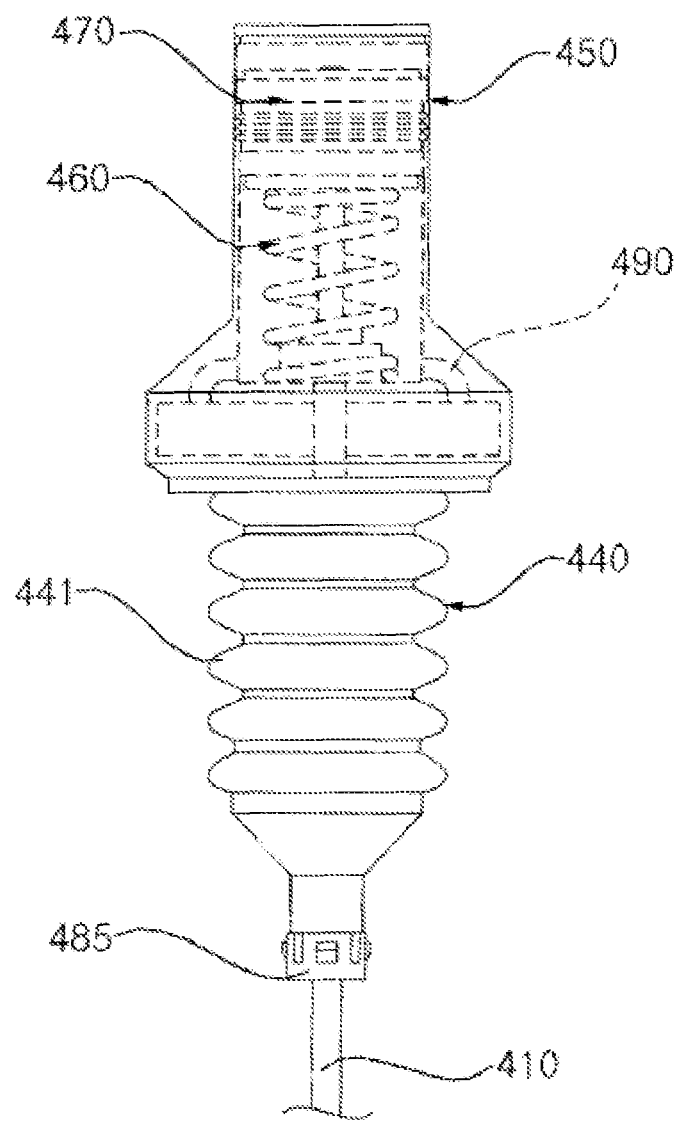
FIG. 17 is a view illustrating the internal construction of the shock-absorbing unit shown in FIG. 16.

FIG. 16 is a view illustrating a shock-absorbing unit according to a further embodiment of the present invention. FIG. 17 is a view illustrating the internal construction of the shock-absorbing unit shown in FIG. 16. Referring to FIGS. 16 and 17, the washing machine may include the shock-absorbing unit 400 according to the further embodiment of the present invention. The shock-absorbing unit 400 may include a support rod 410, a first fluid container 440 and a second fluid container 450.

The support rod 410 serves to suspend the outer tub 2 in the casing 10, and is connected to the outer tub 20. When the outer tub 2 is displace upward or downward due to the vibration thereof, the support rod 410 is also displaced in the same direction as the outer tub 2.

The first fluid container 440 contains fluid therein, and the amount of fluid contained in the first fluid container 440, that is, the housing capacity C varies as the outer tub 2 vibrates. The housing capacity may decrease when the outer tub 2 is displaced downward (ΔC<0), and may increase when the outer tub 2 is displaced upward (ΔC>0). An amount of fluid equal to the variation amount (ΔC) in the housing capacity of the first fluid container 440 is discharged from the first fluid container 440 or is introduced into the first fluid container 440.

An amount of fluid corresponding to the variation amount (ΔC) is circulated between the second fluid container 450 and the first fluid container 440. Specifically, when the housing capacity of the first fluid container 440 decreases, an amount of fluid equal to the decreased variation amount is transferred from the first fluid container 440 to the second fluid container 450. In contrast, when the housing capacity of the first fluid container 440 increases, an amount of fluid equal to the increased variation amount is transferred from the second fluid container 450 to the first fluid container 440.

The support rod 410 may be disposed so as to pass through the first fluid container 440 and the second fluid container 450. The end of the support rod 410 that extends downward through the first fluid container 440 may be connected to the outer tub 2, and the other end of the support rod 410 may be disposed inside the second fluid container 450. The shock-absorbing unit 400 may further include a fluid flow conduit 490, which allows fluid to be circulated between the first fluid container 440 and the second fluid container 450. A dynamic pressure actuator 470 may be provided at the other end of the support rod 410.

The outer tub 2 may be provided with the support rod connector 21 to which the lower end of the support rod 410 is connected. The support rod connector 21 may be provided at the lower portion of the outer tub 2 so as to project from the outer surface of the outer tub 2. The support rod connector 21 is partially opened in a side surface thereof so as to allow the support rod 410 to be inserted therethrough. The support rod 410, which is inserted through the opened portion, engages at the lower end thereof with the bottom surface of the support rod connector 21.

Unlike the above-described embodiments, the fluid flow conduit 490 may be a component independent of the support rod 410, and may be preferably constituted by a plurality of tubes, which allow the upper portion of the first fluid container 440 to communicate with the lower portion of the second fluid container 450.

The dynamic pressure actuator 270 may include a caulking 470, which is in close contact with the inner circumferential surface of the second fluid container 450. The caulking 470 is moved upward and downward in the second fluid container 450 by displacement of the outer tub 2.

The shock-absorbing unit 400 may further include an elastic member 460, which is disposed inside the second fluid container 450 so as to elastically support the caulking 470. The elastic member 460 may be embodied as a spring. When the outer tub 2 is displaced downward, the caulking 470 is lowered along with the support rod 410. At this time, since both the supporting force exerted by the elastic member 460 and the dynamic pressure of the fluid introduced into the second fluid container 450 due to the decrease in the housing capacity of the first fluid container 440, are applied to the caulking 470, the downward displacement of the outer tub 2 is attenuated.

In contrast, when the outer tub 2 is displaced upward, the housing capacity of the first fluid container 440 increases. As a result, negative pressure is created in the second fluid container 450, and fluid is transferred from the second fluid container 450 to the first fluid container 440 through the fluid flow conduit 490.

The first fluid container 440 may include a bellows tube 441, which is supported by the casing 10. Since the bellows tube 441 is expanded or contracted due to vibration of the outer tub 2, the capacity to hold fluid, that is, the internal volume of the bellows tube, varies. The bellows tube 441 includes a plurality of wrinkles so as to be collapsible due to variation in the longitudinal external force applied thereto, and is preferably made of a soft material.

The casing 10 may include a support member 19 having an opening through which the support rod 410 passes, and the first fluid container 440 may be supported by the support member 19. The support member 19 may be integrally formed with the casing 10, or may be separately formed and may be coupled to a component constituting the casing 10.

The support member 19 may be provided with a through hole through which the support rod 410 passes.

The shock-absorbing unit 400 may further include a slide member 485, which is movable along the support rod 410. The slide member 485 may be disposed under the first fluid container 440. Since the slide member 485 is supported by the support member 19 when the outer tub 2 is displaced downward, the slide member 485 is maintained in a state of being in close contact with the first fluid container 440. When the outer tub 2 is displaced upward, the housing capacity of the first fluid container 440 increases (i.e. the bellows tube 441 is expanded), and the slide member 485 is correspondingly lowered. At this time, the slide member 485 is also maintained in the state of being in close contact with the first fluid container 440. Consequently, the slide member 485 may be always in close contact with the first fluid container 440, thereby providing a reliable airtight seal for the first fluid container 440.

In this embodiment, although the support member 19 is disposed at an upper position inside the casing 10, the present invention is not limited thereto. In some embodiments, the support member 19 may be disposed at a lower position inside the casing 10. In this case, the overall structure of the shock-absorbing unit 400 is changed such that the first fluid container 440 is disposed in accordance with the position of the support member 19.

Figure 18:
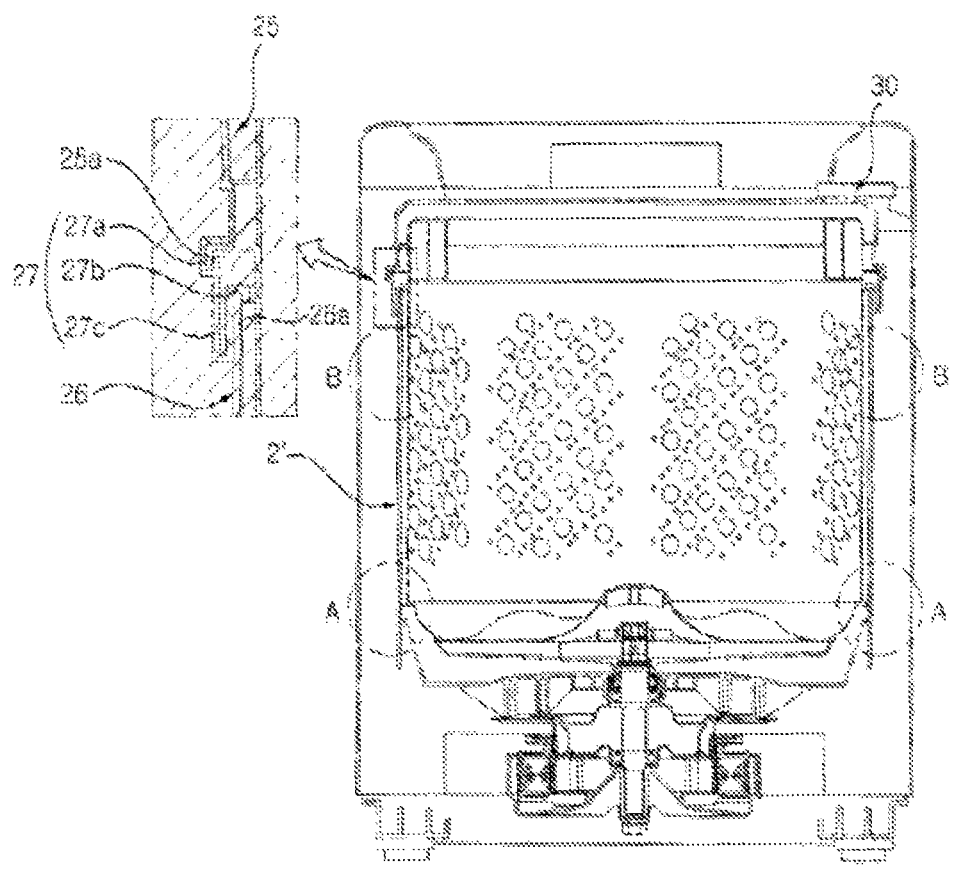
FIG. 18 is a view illustrating a washing machine according to a further embodiment of the present invention.

FIG. 18 is a view illustrating a washing machine according to a further embodiment of the present invention. Referring to FIG. 18, in the washing machine according to this embodiment, an outer tub 2' includes an upper outer tub part 25 fixed to the casing 10, a lower outer tub part 26, which is disposed under the upper outer tub part 25 and is buffered by the shock-absorbing unit 100, 200, 200', 300 or 400, and a connecting part 27, which connects the upper outer tub part 25 to the lower outer tub part 26 and which is deformed by the displacement of the lower outer tub part 26. For smooth deformation, the connecting part 27 is preferably made of a soft material having resiliency, such as rubber or synthetic resin.

The connecting part 27 may include an upper coupler 27a, which is configured to have an annular section corresponding to the horizontal section of the outer tub 2' and which is coupled to a lower end 25a of the upper outer tub part 25, a lower coupler 27b, which is coupled to an upper end 26a of the lower outer tub part 26, and a foldable part 27, which is disposed between the upper coupler 27a and the lower coupler 27b and which is folded at least once. Accordingly, there is an advantage in that shocks are absorbed by the folding of the foldable part 27 in response to vibrations of the lower outer tub part 26.

The coupling between the upper coupler 27a and the upper outer tub part 25 and the coupling between the lower coupler 27b and the lower outer tub part 26 are preferably implemented in a sealable manner. To this end, the upper coupler 27a may be coupled in such a manner as to surround the lower end 25a of the upper outer tub part 25. The lower end 25a of the upper outer tub part 25 or the upper end 26a of the lower outer tub part 26 may be bent in various fashions. In this case, the upper coupler 27a or the lower coupler 27b is preferably configured so as to have a structure corresponding to the bent structure for the sake of robustness and airtightness of the coupling.

The washing machine may further include an outer tub-fixing member 30 for fixing the upper outer tub part 25 to the casing 10. The outer tub-fixing member 30 may be fixedly disposed in the casing 10, and may be configured to surround at least a portion of the outer circumference of the upper outer tub part 25. The outer tub-fixing member 30 may include a plurality of outer tub-fixing members, which are provided along the outer circumference of the upper outer tub part 25.

The lower outer tub part 26 may be provided with the shock-absorbing unit 100, 200, 200', 300 or 400) according to the above-described embodiments. The lower outer tub part 26 may be provided with a support rod connector 21 (see FIG. 11) or the piston connector 22 (see FIG. 15), depending on the kind of shock-absorbing unit 100, 200, 200', 300 or 400. In FIG. 18, circle A and circle B indicate positions at which the shock-absorbing unit 100, 200, 200', 300 or 400 can be installed. Circle A indicates a lower portion of the lower outer tub part 26, and circle B indicates an upper portion of the lower outer tub part 26. Specifically, the piston connector 22 (or the support rod connector 21) may be formed at a predetermined position on the lower outer tub part 26. In particular, the piston connector 22 may be formed not only at the lower portion A of the lower outer tub part 26 but also at the upper portion B of the lower outer tub part 26. The structure of the shock-absorbing unit 100, 200, 200', 300, 400 may also be changed within the scope and spirit of the present invention, in accordance with the position of the piston connector 22 (or support rod connector 21).

The vibration of the lower outer tub part 26 can be attenuated by means of the shock-absorbing unit 100 or 200, unlike the conventional technology. Furthermore, since the upper outer tub part 25 is always fixed to the casing 10 even when vibrates are generated, it is possible to fundamentally prevent collisions with the upper portion of the casing (for example, the top cover 12). Consequently, the distance between the upper outer tub part 25 and the top cover 12 can be reduced compared to the conventional technology, and the capacity of the outer tub can be increased by virtue of the reduction of the distance.

The shock-absorbing unit 100, 200, 200', 300 or 400 according to the above-described embodiments may be provided in the casing in a plural number. In this case, the shock-absorbing units 100, 200, 200', 300 or 400 may be symmetrically arranged with respect to the center of the inner tub 3, and in particular may be disposed at the four corners of the casing 10.

The invention claimed is:

1. A laundry treatment apparatus comprising:
   a casing;
   an outer tub disposed in the casing;
   a support rod having a first end connected to the casing;
   an outer tub support part configured to move along the support rod and support the outer tub;
   at least one elastic member attached to the support rod so as to elastically support the outer tub support part from below;
   a first friction part disposed above the outer tub support part and surrounding the support rod so as to create frictional force between the support rod and the first friction part; and
   a housing defining a space in which the first friction part is accommodated, wherein the housing is arranged above the outer tub support part and is configured to move along the support rod together with the outer tub support part when the outer tub vibrates, wherein the housing is configured to independently move along the support rod when the outer tub support part is moved within a predetermined displacement range and is configured to move while pushing the first friction part when the outer tub support part is moved beyond the predetermined displacement range, and wherein the outer tub support part comprises:
- a neck including a longitudinal central hole through which the support rod passes, wherein an upper end of the neck is coupled to the housing; and
- a cap provided at a lower end of the neck and enlarged radially and outwardly, wherein a lower end of the cap is elastically supported by the elastic member and an upper end of the cap supports the outer tub and wherein the housing is removably coupled to the neck.

2. The laundry treatment apparatus according to claim 1, wherein one of the housing and the neck is provided with a coupling protrusion, and the other of the housing and the outer tub support part is provided with a coupling loop with which the coupling protrusion engages.

3. The laundry treatment apparatus according to claim 2, wherein engagement between the coupling protrusion and the coupling loop is achieved by relative rotation between the housing and the outer tub support part about the support rod.

4. The laundry treatment apparatus according to claim 2, wherein the coupling protrusion is formed on the neck.

5. The laundry treatment apparatus according to claim 1, wherein one of the first friction part and the housing includes a protrusion projecting from a predetermined surface thereof, and a remaining one of the first friction part and the housing is in contact with the protrusion while the housing is moved.

6. The laundry treatment apparatus according to claim 5, wherein the first friction part comprises:
- a soft frictional member for creating frictional force between the support rod and the frictional member, and
- a hard holder movable along the support rod and receiving therein the frictional member, and
- wherein the protrusion is formed on the housing.

7. The laundry treatment apparatus according to claim 1, wherein the housing comprises:
- an upper wall portion defining an upper surface of the space;
- a lower wall portion defining a lower surface of the space; and
- a plurality of side wall portions connecting the upper wall portion to the lower wall portion and defining a side surface of the space, the plurality of side wall portions being arranged at predetermined intervals, and a spacing between a pair of adjacent ones of the plurality of side wall portions being sized so as to allow the first friction part to pass therethrough.

8. The laundry treatment apparatus according to claim 7, wherein at least one of the upper wall portion and the lower wall portion includes a protrusion that the first friction part contacts while being moved.

9. The laundry treatment apparatus according to claim 7, wherein each of the upper wall portion and the lower wall portion has therein a hole through which the support rod passes.

10. The laundry treatment apparatus according to claim 1, wherein the laundry treatment apparatus further comprises a second friction part that surrounds the support rod and is provided within the cap, the second friction part always creating frictional force between the support rod and the second friction part when the outer tub vibrates.

11. The laundry treatment apparatus according to claim 10, wherein the cap comprises:

- an upper wall portion supporting the outer tub;
- a lower wall portion spaced apart from the upper wall portion and elastically supported by the elastic member; and
- a plurality of side wall portions connecting the upper wall portion to the lower wall portion, the plurality of side wall portions being arranged at predetermined intervals, and a spacing between a pair of adjacent ones of the plurality of side wall portions being sized so as to allow the second friction part to pass therethrough.

12. The laundry treatment apparatus according to claim 11, wherein the second friction part comprises:
- a soft frictional member fitted over the support rod, and
- a hard holder accommodating the frictional member therein.

13. The laundry treatment apparatus according to claim 1, wherein the at least one elastic member includes first and second springs, which are concentrically arranged.

14. The laundry treatment apparatus according to claim 13, wherein the second spring is compressed after the first spring has been compressed to a predetermined extent by being pushed by the outer tub support part.

15. The laundry treatment apparatus according to claim 14, further comprising a movable member, which is disposed under the outer tub support part and is movable along the support rod, the movable member being elastically supported by the second spring,
- wherein the movable member is moved by the outer tub support part after the first spring has been compressed to a predetermined extent.

16. The laundry treatment apparatus according to claim 15, wherein the second spring is disposed inside the first spring.

17. The laundry treatment apparatus according to claim 15, wherein the support rod includes a base provided at a remaining end thereof so as to support the first spring,
- wherein the base includes an annular partition wall projecting from a surface thereof supporting the first spring, and
- wherein the partition wall is disposed inside the first spring, and the second spring is disposed inside the partition wall.

18. The laundry treatment apparatus according to claim 17, wherein at least one of the first and second springs is coupled to the base so as to prevent rotation thereof about the support rod.

19. The laundry treatment apparatus according to claim 17, wherein the first and second springs are concentrically arranged when viewed in a transverse section.

20. The laundry treatment apparatus according to claim 1, wherein the elastic member has a modulus of elasticity that varies nonlinearly depending on a load.

21. The laundry treatment apparatus according to claim 20, wherein the elastic member includes an irregular pitch spring, which has sections having mutually different pitches.

22. The laundry treatment apparatus according to claim 21, wherein the irregular pitch spring includes one section having a predetermined pitch and a predetermined length, and a pair of sections, which are disposed at opposite ends of the one section and having a pitch different from the one section, and which extend therefrom.

23. The laundry treatment apparatus according to claim 22, wherein among the sections, the one section has the greatest pitch.

24. A laundry treatment apparatus comprising;
- a casing;
- an outer tub disposed in the casing;
- a support rod having a first end connected to the casing;

an outer tub support part configured to move along the support rod and support the outer tub;

at least one elastic member attached to the support rod so as to elastically support the outer tub support part from below;

a first friction part disposed above the outer tub support part and surrounding the support rod so as to create frictional force between the support rod and the first friction part;

a housing defining a space in which the first friction part is accommodated, wherein the housing is arranged above the outer tub support part and is configured to move along the support rod together with the outer tub support part when the outer tub vibrates, and wherein the housing is configured to independently move along the support rod when the outer tub support part is moved within a predetermined displacement range and is configured to move while pushing the first friction part when the outer tub support part is moved beyond the predetermined displacement range; and at least one magnet configured to create an attractive force attributable to a magnetic field between the first friction part and the housing in a direction perpendicular to a moving direction of the first friction part, wherein the magnet is provided at one of the first friction part and the housing, and a remaining one of the first friction part and the housing includes a material configured to create an attractive force between the magnet and the material.

25. The laundry treatment apparatus according to claim 24, wherein the first friction part comprises:

a soft frictional member configured to create a frictional force between the support rod and the frictional member, and a holder configured to move along the support rod and receiving therein the frictional member, wherein the housing comprises:

an upper wall portion configured to push the first friction part downward while the outer tub support part is displaced downward;

a lower wall portion longitudinally spaced apart from the upper wall portion at a predetermined interval so as to accommodate the first friction part therebetween; and a side wall portion connecting the upper wall portion to the lower wall portion, and wherein the holder is made of a material configured to create the attractive force between the magnet and the material, and wherein the magnet is spaced apart from the material and is provided at the side wall portion.

26. The laundry treatment apparatus according to claim 25, wherein the magnet is arranged outside the side wall portion.

* * * * *